United States Patent [19]

Tabe et al.

[11] Patent Number: 5,419,122
[45] Date of Patent: May 30, 1995

[54] DETECTION OF CATALYTIC CONVERTER OPERABILITY BY LIGHT-OFF TIME DETERMINATION

[75] Inventors: Ferdinand E. Tabe, Oak Park, Ill.; Charles F. Aquino, Ann Arbor; John E. Bradley, Detroit, both of Mich.

[73] Assignee: Ford Motor Company, Dearborn, Mich.

[21] Appl. No.: 130,804

[22] Filed: Oct. 4, 1993

[51] Int. Cl.$^6$ ............................................. F01N 3/20
[52] U.S. Cl. ........................................ 60/274; 60/277; 60/284
[58] Field of Search ......................... 60/274, 284, 277

[56] References Cited

U.S. PATENT DOCUMENTS

| | | | |
|---|---|---|---|
| 3,751,914 | 8/1973 | Pollock | 60/284 |
| 3,949,551 | 4/1976 | Eichler | 60/284 |
| 5,191,763 | 3/1993 | Yuuki | 60/284 |
| 5,193,340 | 3/1993 | Kamihara | 60/286 |
| 5,211,011 | 5/1993 | Nishikawa | 60/284 |
| 5,263,318 | 11/1993 | Oota | 60/284 |
| 5,277,025 | 1/1994 | Gonze | 60/274 |

FOREIGN PATENT DOCUMENTS 257 10/1993 W.I.P.O.

*Primary Examiner*—Ira S. Lazarus
*Assistant Examiner*—Daniel J. O'Connor
*Attorney, Agent, or Firm*—Allan J. Lippa; Roger L. May

[57] ABSTRACT

An electronic engine controller monitors the operability of a catalytic converter upon ignition of the engine by sensing the temperature of the exhaust gas entering the converter and of the exhaust gas exiting the converter for a period of time after the engine has been started. The electronic engine controller calculates the rate of heat transfer from the exhaust gas to the catalyst material within the converter. This value is then used to calculate the temperature of the catalyst material. Subsequent rates of heat transfer and subsequent temperatures of the catalyst material are calculated and the rate of change of temperature of the catalyst material is determined for each time step. A ratio is formed from the rate of heat transfer and the rate of change of temperature of the catalyst material. The electronic engine controller determines the ratio of the rate of heat transfer and the rate of change of temperature of the catalyst material for the period of time from engine ignition to catalyst light-off. This period of time, the light-off time, is checked against a predetermined trend in the ratio and a converter inoperative condition is set if the light-off time is greater than the threshold value.

6 Claims, 3 Drawing Sheets

DETECTION OF CATALYTIC CONVERTER OPERABILITY BY LIGHT-OFF TIME DETERMINATION

FIELD OF THE INVENTION

This invention relates to methods and apparatus for detecting the operability of a catalytic converter, and more particularly, although in its broader aspects not exclusively, to the on-board monitoring of catalytic converter operability.

BACKGROUND OF THE INVENTION

Modern automotive engines typically utilize a catalytic converter to reduce the exhaust gas emissions produced by the engine. Such converters operate to chemically alter the exhaust gas composition produced by the engine to help meet various environmental regulations governing tailpipe emissions. When operating properly, modern catalytic converters can reduce the concentration of the three major undesirable exhaust gases—hydrocarbons, carbon monoxide, and various nitrous oxides—by about 90%.

Several methods exist in the art for determining the operability of a catalytic converter. One method involves directly measuring the efficiency of the converter by using exhaust gas emission sensors. Another method involves determining catalytic converter efficacy based largely on measures of the oxygen storage capability of the converter. A converter with reduced oxygen storage capability may, however, function with acceptable efficiency in treating exhaust gas. That is, the treated exhaust gas may meet emission requirements notwithstanding such reduced oxygen storage capability, particularly by effective use of oxygen components present in the exhaust gas. In such cases, an accurate catalytic converter efficiency test could be less directly related to oxygen storage capability.

Another method, as proposed in SAE Paper No. 900062, Detection of Catalyst Performance Using On-Board Diagnostics, employs two exhaust gas oxygen (EGO) sensors, one upstream and one downstream of the catalytic converter, to detect oxygen content in the exhaust gas. The system employs test signals in the form of an air/fuel ratio swing on both sides of stoichiometry at predetermined rates or frequencies caused by fuel control system perturbations. A determination of catalytic converter efficacy is said to be made by comparing the difference in response patterns between the upstream and downstream EGO sensors. In such a system, the monitoring results depend on signals from two EGO sensors which may have different characteristics, due either to manufacturing tolerances or to differential aging over a period of use. Moreover, such a system requires the use of multiple EGO sensors.

Accordingly, there is a need for a method of determining the operability of a catalytic converter via on-board vehicle diagnostics in a reliable and accurate manner.

SUMMARY OF THE INVENTION

It is a primary object of the present invention to determine the operability of a catalytic converter on a vehicle utilizing on-board diagnostics. In accordance with the primary, object of the invention, in a preferred embodiment, an electronic engine controller detects, upon engine ignition, via an upstream and a downstream thermocouple, or other temperature sensing device such as a resistive temperature device (RTD), the temperature of the exhaust gas entering and exiting the catalytic converter. The electronic engine controller then calculates, from the detected temperature of the exhaust gas entering and exiting the catalytic converter, the time period required for the catalyst material within the catalytic converter to light-off. This time period is then compared with a threshold value, and if the time period required for the catalyst material to light-off is greater than the threshold value, then a converter inoperative condition is set. Otherwise, if the light-off time is less than the threshold value the converter is deemed to be operative.

The converter test method described above provides a highly advantageous method for determining the operability of the catalytic converter using on-board vehicle diagnostics in a reliable and accurate manner. The converter test method described above can be performed each time the engine is started and the catalytic converter has cooled to a temperature below which light-off occurs. Consequently, certain preferred embodiments advantageously determine in a reliable and accurate manner, the operability of the catalytic converter virtually each time the engine is started. If the converter is deemed to be inoperative the vehicle operator may then take appropriate action, thereby avoiding the increased emissions which result from driving a vehicle with an inoperative catalytic converter.

These and other features and advantages of the present invention may be better understood by considering the following detailed description of a preferred embodiment of the invention. In the course of this description, reference will frequently be made to the attached drawings.

DETAILED DESCRIPTION

Figure 1:
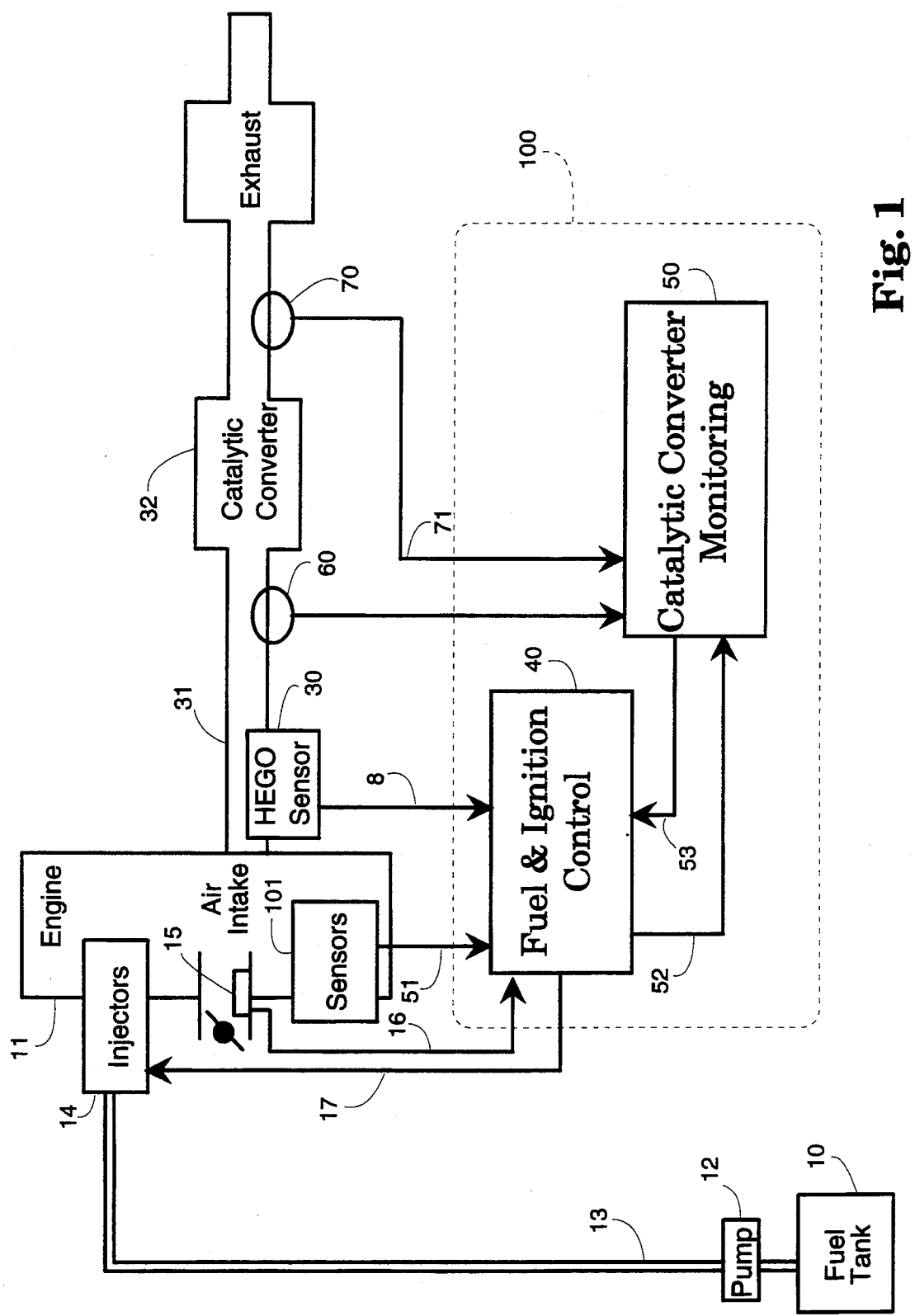
FIG. 1 is a schematic diagram of an internal combustion engine and an electronic engine controller which embodies the principles of the invention.

FIG. 1 of the drawings shows a system which embodies the principles of the invention. A fuel pump 12 pumps fuel from a fuel tank 10 through a fuel line 13 to a set of fuel injectors 14 which inject fuel into an internal combustion engine 11. The fuel injectors 14 are of conventional design and are positioned to inject fuel into their associated cylinder in precise quantities. The fuel tank 10 advantageously contains liquid fuels such as, gasoline, methanol, or a combination of fuel types.

A heated exhaust gas oxygen (HEGO) sensor 30, positioned on the exhaust system 31 of the engine 11, detects the oxygen content of the exhaust gas generated by the engine 11 and transmits a representative signal 8 to an Electronic Engine Controller (EEC) 100. Still other sensors, indicated generally at 101, provide additional information about engine performance to the EEC 100, such as crankshaft position, angular velocity, throttle position, etc. The information from these sensors is used by the EEC 100 to control engine operation.

A mass air flow detector 15 positioned at the air intake of engine 11 detects the amount of air being supplied to cylinders for combustion and supplies an air flow signal 16 to the EEC 100. The EEC 100 implements the functions shown, in block diagram form, within the dashed line 100 in FIG. 1. The EEC functions 100 are preferably implemented by one or more microcontrollers, each being comprised of one or more integrated circuits providing a processor, a read-only memory (ROM) which stores the programs executed by the processor and configuration data, peripheral data handling circuits, and a random access read/write memory for storing dynamically changing data. These microcontrollers typically include built-in analog-to-digital conversion capabilities useful for translating analog signals from sensors and the like into digitally expressed values, as well as timer/counters for generating timed interrupts.

The fuel and ignition control module 40 contained within the EEC 100 receives the HEGO signal 8 indicative of the amount of oxygen in the exhaust gas, the air flow signal 16 and a variety of other signals 51 and calculates the amount of fuel to be delivered to the injectors 14. The module 40 also controls the ignition timing of the air/fuel mixture combusted in each of the cylinders of the engine.

The catalytic converter monitoring module 50 operates generally to periodically monitor the operation of the catalytic converter 32 and to inform the fuel and ignition control module 40 as to the operability of the converter 32. The monitoring module 50 operates under control of the fuel and ignition control module 40 via a plurality of signals 52. An upstream thermocouple 60 and a downstream thermocouple 70 transmit signals 61 and 71 respectively, to the monitoring module 50. The thermocouples 60 and 70 are of known type and are positioned to detect the temperature of the air flowing past them. Upstream thermocouple 60 is positioned to detect the temperature of the air flowing into the converter 32 and downstream thermocouple 70 is positioned to detect the temperature of the air flowing out of the converter 32. Each of the thermocouples transmits a signal which indicates the temperature of the exhaust gas detected by the thermocouple.

Figure 2:
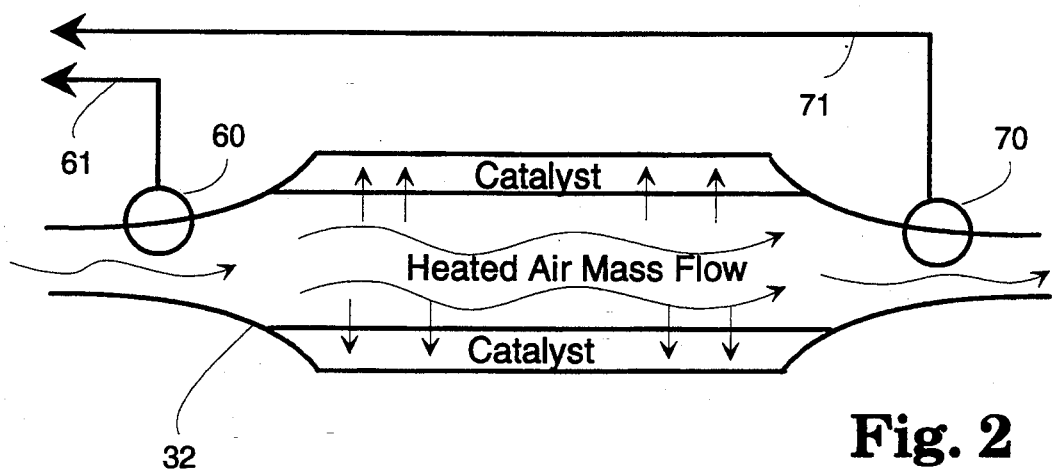
FIG. 2 is a diagram showing conceptually, the operation of a catalytic converter of the type utilized in the preferred embodiment.

FIG. 2 of the drawings shows conceptually, the flow of exhaust gas past the thermocouples 60 and 70 and through the catalytic converter 32 before the converter 32 reaches operating temperature. As shown in FIG. 2 a heated air mass is propelled from the engine 11 past the upstream thermocouple 60 which detects the temperature of the heated air mass as it enters the converter 32 and transmits a representative signal via signal line 61. As the heated air mass is propelled through the converter, heat from the air mass flows to the catalyst material contained within the converter. The downstream thermocouple 70 detects the temperature of the air mass as it exits the converter and transmits a representative signal via signal line 71.

Figure 4:
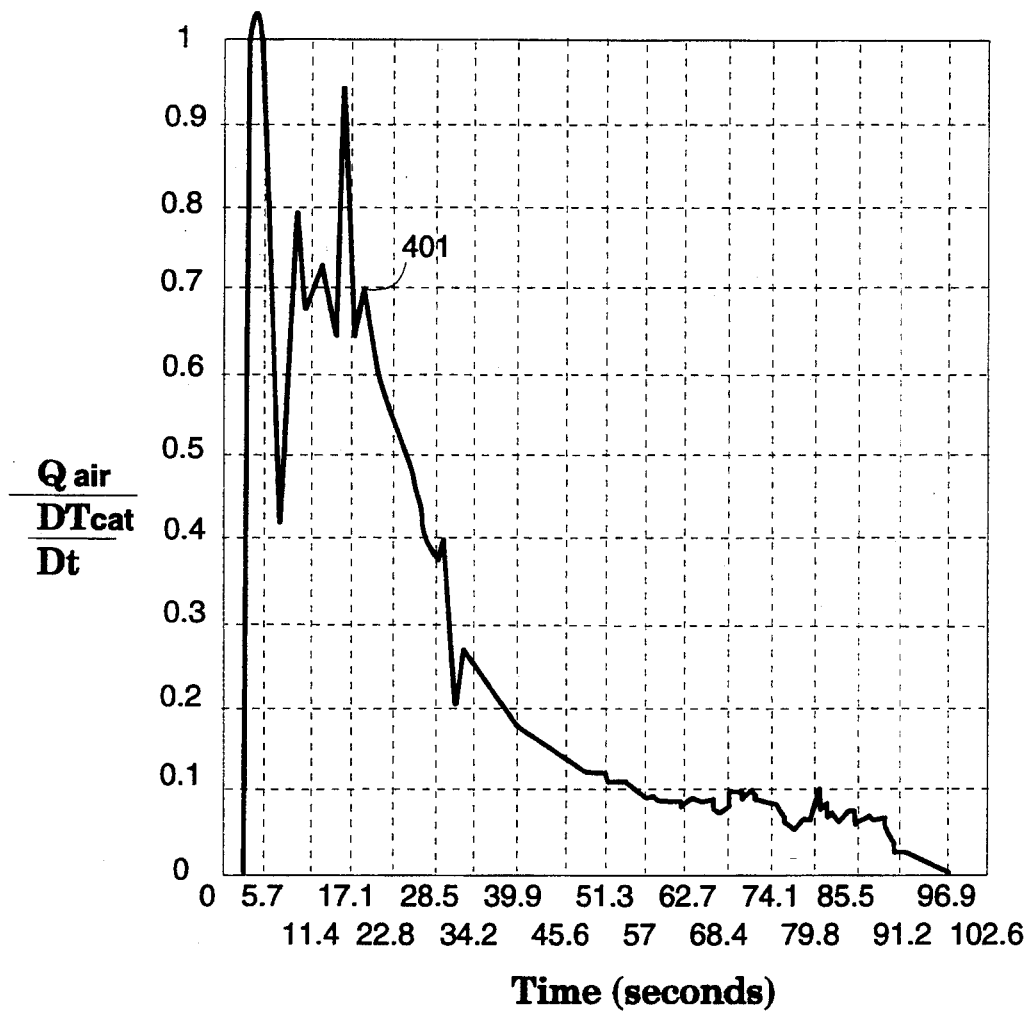
FIG. 4 is a graph showing the heat flow from the air divided by the rate of increase of catalyst temperature as a function of the catalyst temperature over time for a catalytic converter of the type utilized in the preferred embodiment.

The flow of heat from the air mass to the catalyst as shown in FIG. 2 will exhibit a relationship to the rate of catalyst temperature increase ($dT_{cat}/dt$) as shown in FIG. 4 that will change abruptly upon catalyst light-off. Herein termed the light-off time, this period of time is the time required for the catalyst material to reach a temperature at which the reactants within the catalyst material will react with components of the heated air mass and produce heat. In the preferred embodiment, the light-off time is determined to be the time required for the catalytic converter to become chemically active. A catalytic converter which is operating properly will have a light-off time which is within a known range. Consequently, if the light-off time is outside of the known range, the converter can be deemed to be inoperative.

FIG. 4 of the drawings shows the variation in heat transfer from the air (exhaust gas) in relation to the rate of increase of catalyst temperature for a catalytic converter of the type utilized in the preferred embodiment. The horizontal axis represents time elapsed from engine crank. As can be seen from FIG. 4, the ratio comprising the rate of heat transfer, $Q_{air}$, and the rate of change of the catalyst temperature, $Dt_{cat}/DT$, exhibits a start-up transient for about six seconds, after which it oscillates around a value of approximately 0.7. As shown at 401, at approximately twenty seconds, the catalyst material within the converter becomes chemically active and the ratio thereafter drops dramatically, indicating catalyst light-off.

The preferred embodiment of the present invention advantageously detects the light-off time of the converter and checks whether the time is within a predetermined range. If the light-off time for the converter is within the predetermined range, the converter is deemed to be operative. However, if the light-off time for the converter is outside of the range then the converter is deemed to be inoperative and a converter inoperative condition is set. The setting of this condition will result in the EEC 100 providing an indication to the operator of the vehicle of the inoperative condition of the converter.

Figure 3:
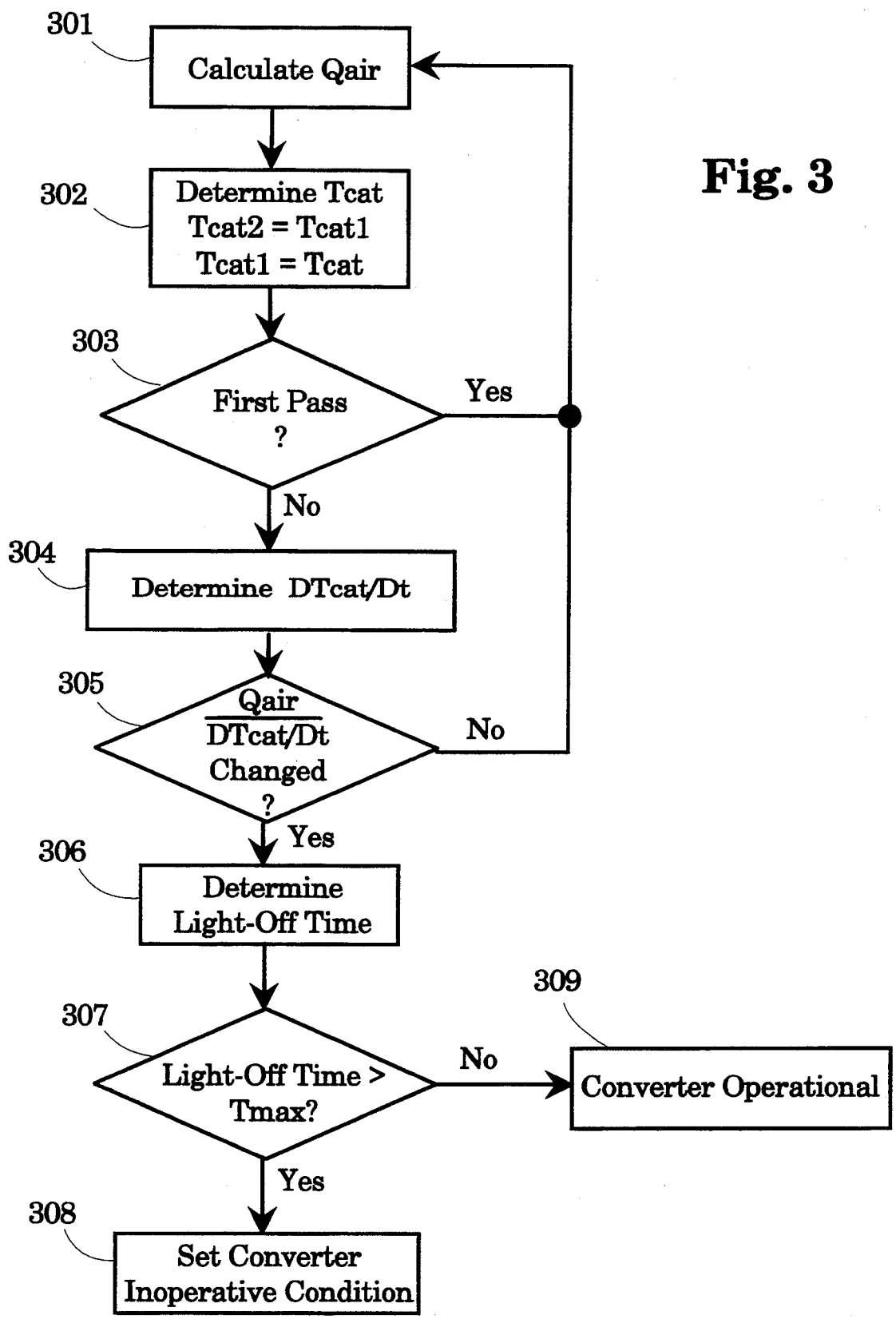
FIGS. 3 is a flowchart showing the operation of a preferred embodiment of the invention.

FIG. 3 of the drawings shows generally, the steps taken by the preferred embodiment to determine the operability of the catalytic converter. The steps shown in FIG. 3 are performed shortly after the engine has been started and the converter has cooled to a temperature below which light-off occurs, and are continued until catalyst light-off is achieved.

First, as seen as 301, the rate of heat transfer from the heated air mass to the catalyst material—$Q_{air}$, is calculated using the following relationship:

$$Q_{air} = \dot{m}_{air} c_{P\,air}(T_i - T_o) \quad (1)$$

where
$Q_{air}$ is the rate of heat transfer from the heated air mass to the catalyst, in BTU/hour,
$\dot{m}_{air}$ is the mass flow rate of air through the converter in lbs/hour,
$c_{air}$ is a constant representative of the specific heat of air,
$T_i$ is the temperature of the heated air mass flowing into the catalytic converter as detected by the upstream thermocouple 60, and
$T_o$ is the temperature of the heated air mass flowing out of the catalytic converter as detected by the downstream thermocouple 70.

Once the rate of heat transfer is known, the temperature of the catalyst, $T_{cat}$ is determined as seen at 302. This value is advantageously determined using the standard form of heat convective relationship which takes the following form:

$$Q_{air} = AC_1 \dot{m}_{air}{}^\alpha (T_{avg} - T_{cat}) \quad (2)$$

where

Q is as described above,

A is the total surface area of the exhaust pipe and catalyst material between the upstream thermocouple and the downstream thermocouple, $C_1$ is a constant representative of the transfer of heat from the heated air mass to the catalyst material, $\alpha$ is a constant with an approximate value of 0.5 for laminar flow, and an approximate value of 0.9 for turbulent flow, $\dot{m}_{air}$ is as described above, $T_{avg}$ is the average of $T_i$ and $T_o$, and $T_{cat}$ is the temperature of the catalyst. Variables $T_{cat1}$ and $T_{cat2}$ allow the storage of two values of $T_{cat}$ which are determined at different points in time in order to allow for a rate of change of $T_{cat}$ with respect to time to be calculated at 304.

At 303, a determination is made whether steps 301 and 302 have been performed twice in order to determine first and second values of $T_{cat}$ - - - $T_{cat1}$ and $T_{cat2}$. If steps 301 and 302 have only been executed once, i.e. through a first pass, then they are executed again in order to determine a second value of $T_{cat}$. However, if values for $T_{cat1}$ and $T_{cat2}$ have been determined then a rate of change of the temperature of the catalyst material with respect to time $-DT_{cat}/Dt$, is determined as seen at 304.

The mass flow rate of air through the converter, $\dot{m}_{air}$ as seen in equation (2) is raised to the 0.9 power in the preferred embodiment to account for the particular exhaust geometry and mass air flow rate of the engine's exhaust system. This value is empirically derived by observing changes in $Q_{air}$ as $\dot{m}_{air}$ changes before a catalyst light-off, and will vary for engines having different exhaust system geometries or air flow rates during warm up.

The relationship shown in equation (2) which expresses the heat flow from the heated air mass to the catalyst material may also be expressed as a function of the rate of increase of temperature of the catalyst material in the following manner:

$$Q_{air} = m_{cat} c_{pcat} \frac{dT_{cat}}{dt} \quad (3)$$

where $Q_{air}$ is as above, $m_{cat}$ is the mass of the catalyst material, $c_{pcat}$ is a constant representative of the specific heat of the catalyst material, and $dT_{cat}/dt$ is the rate of change of the temperature of the catalyst material with respect to time.

Rearranging equation (3) results in the following:

$$\frac{Q_{air}}{\frac{dT_{cat}}{dt}} = m_{cat} c_{pcat} \quad (4)$$

The relationship expressed in equations (3) and (4) assumes the heated mass of air to be the sole source of heat, and accordingly is valid only for the time period up to catalyst light-off. As seen in equation (4) during this time period, because neither the mass of the catalyst $-m_{cat}$, nor the specific heat of the catalyst $-c_{pcat}$ changes, the relationship between the rate of heat transfer from the heated air mass to the catalyst material $-Q_{air}$, and the rate of change of temperature of the catalyst material $-dT_{cat}/dt$, will remain essentially constant before catalyst light-off. Upon light-off, the quantity on the left side of equation (4) will begin to decrease, thus indicating light-off.

The ratio comprising the rate of heat transfer from the heated air mass to the catalyst material and the rate of change of the temperature of the catalyst material (the quantity on the left side of equation (4))is checked, as indicated at 305, against predetermined criteria to determine if it exhibits the downturn shown at 401 in FIG. 4. This step is preferably performed a number of times in order to make a robust determination as to whether the downturn shown in at 401 in FIG. 4 has occurred. If so, then steps 301-305 are performed again. If the ratio is outside of the range, then catalyst light-off is assumed to have occurred and the light-off time is determined at 306. At 307 the calculated light-off time is checked against a threshold value, $T_{max}$, and if it is less than $T_{max}$ then the converter is deemed to be operational, 309, and if the calculated light-off time is greater than $T_{max}$ then a converter inoperative condition is set at 308.

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. A method of determining the operability of a catalytic converter which contains a catalyst material, comprising the steps of:

determining the time required for said catalyst material to light-off during a cold start by, (a) propelling a heated air mass through said converter, (b) determining an initial heat transfer rate from said heated air mass to said catalyst material, (c) determining an initial rate of change of temperature of said catalyst material, (d) forming a first ratio from said initial heat transfer rate and said initial rate of change of temperature, (e) determining a subsequent heat transfer rate from said heated air mass to said catalyst material, (f) determining a subsequent rate of change of temperature of said catalytic converter, (g) forming a second ratio from said subsequent heat transfer rate and said subsequent rate of change of temperature, (h) comparing said second ratio to said first ratio to track a trend of said ratios, (i) repeating steps (a) through (h) until the trend of said ratios exhibits a predetermined downturn, and determining the time required for said catalyst to light-off during a cold start to be the time from said propelling step to the time required for said downturn comparing said time to a threshold value, and determining said converter to be faulty if said time exceeds said threshold value.

2. A method as set forth in claim 1 wherein the step of determining said initial heat transfer rate from said heated air mass to said catalyst material comprises the steps of, detecting the temperature difference between the temperature of said heated air mass before entering said converter and the temperature of said heated air mass after exiting said converter, determining the flow rate of said heated air mass through said converter, determining, as a function of said temperature difference and said flow rate of said heated air mass, the heat transfer rate from said heated air mass to said catalyst material.

3. The method as set forth in claim 2 wherein said catalytic converter is installed in a vehicle and the method of determining the operability of the converter is performed as an on-board diagnostic test.

4. In a vehicle which includes an engine and a catalytic converter for processing exhaust gases generated by said engine, a method of determining the operability of said catalytic converter which contains a catalyst material, comprising the steps of:

determining the time required for said catalyst material to light-off during a cold start as a function of a first ratio comprising an initial heat transfer rate between an air mass flowing through said converter and said catalyst material and an initial rate of change of temperature, and a second ratio comprising a subsequent heat transfer rate between said air mass and said catalyst material and a subsequent rate of change of temperature of said catalyst material;

comparing said time required for said catalyst material to light-off during a cold start to a threshold value, and determining said converter to be faulty if said time exceeds said threshold value.

5. In a vehicle including an internal combustion engine for combusting an air/fuel composition, and a catalytic converter having a catalyst means for altering the composition of exhaust gas produced by the combustion of an air/fuel composition, a method for determining the operability of said catalytic converter comprising the steps of, determining the temperature rate of change of said catalyst means;

determining, as a function of said temperature rate of change, the time required for said catalyst means to achieve a chemically active state, comparing the time required for said catalyst means to achieve a chemically active state to a threshold time, and setting a catalytic converter inoperative condition if said time required for said catalyst means to achieve said chemically active state is greater than said threshold time.

6. The method as set forth in claim 5 wherein the step of determining the temperature rate of change of said catalyst means comprises the steps of:

(i) detecting the temperature difference between the temperature of said exhaust gas before entering said converter and the temperature of said exhaust gas after exiting the converter;

(ii) determining the mass flow rate of said exhaust gas through said converter;

(iii) determining, as a function of said temperature difference and said mass flow rate, the heat transfer rate from said exhaust gas to said catalyst means;

(iv) determining a first temperature of said catalyst means in response to said heat transfer rate;

(v) repeating steps (i) through (iii) to determine a subsequent temperature of said catalyst means in response to a subsequent heat transfer rate; and (vi) determining the temperature rate of change of said catalyst material as a function of said first temperature and said subsequent temperature.

* * * * *